Nov. 4, 1958  V. C. BECK  2,858,554
EGG WASHING APPARATUS
Filed Dec. 7, 1954  3 Sheets-Sheet 1

INVENTOR.
Veris C. Beck
BY Green McCallister & Miller
HIS ATTORNEYS

INVENTOR.
Veris C. Beck

HIS ATTORNEYS

Nov. 4, 1958　　　　V. C. BECK　　　　2,858,554
EGG WASHING APPARATUS

Filed Dec. 7, 1954　　　　　　　　　　　　3 Sheets-Sheet 3

INVENTOR.
Veris C. Beck
BY *Green McCallister & Miller*
HIS ATTORNEYS

United States Patent Office 2,858,554
Patented Nov. 4, 1958

2,858,554

EGG WASHING APPARATUS

Veris C. Beck, Loganton, Pa.

Application December 7, 1954, Serial No. 473,656

4 Claims. (Cl. 15—3.13)

This invention relates to egg washing or cleaning apparatus in which eggs are prepared for the market before being placed in containers.

An object of the invention is to produce apparatus for cleaning eggs in which the apparatus is relatively simple and is capable of effectively cleaning a large number of eggs in a relatively short time and at relatively small expense.

A further object is to produce egg cleaning apparatus of simple construction in which a single motor is employed for actuating a conveyor which moves the eggs through the apparatus during the cleaning operation; for driving a pump which delivers cleansing liquid to spray nozzles; for actuating the movable member of a wiping or scouring device which forms a part of the illustrated apparatus; and for driving a fan shown as a part of the illustrated apparatus.

In the drawings forming a part hereof, Figure 1 is a side elevation of apparatus embodying my invention.

Figure 1:
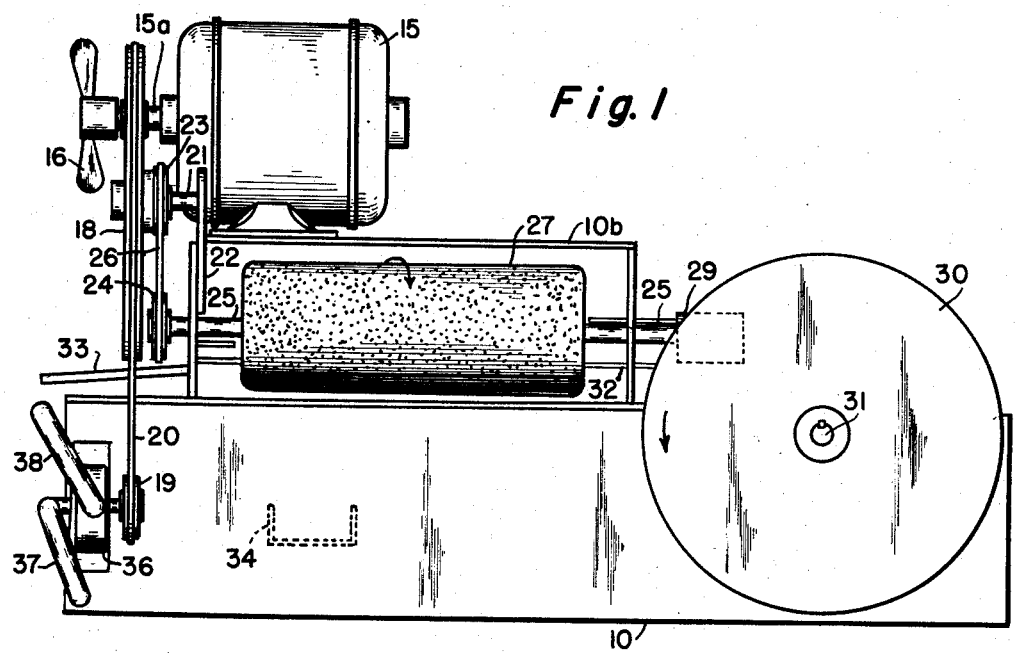
Figure 2:
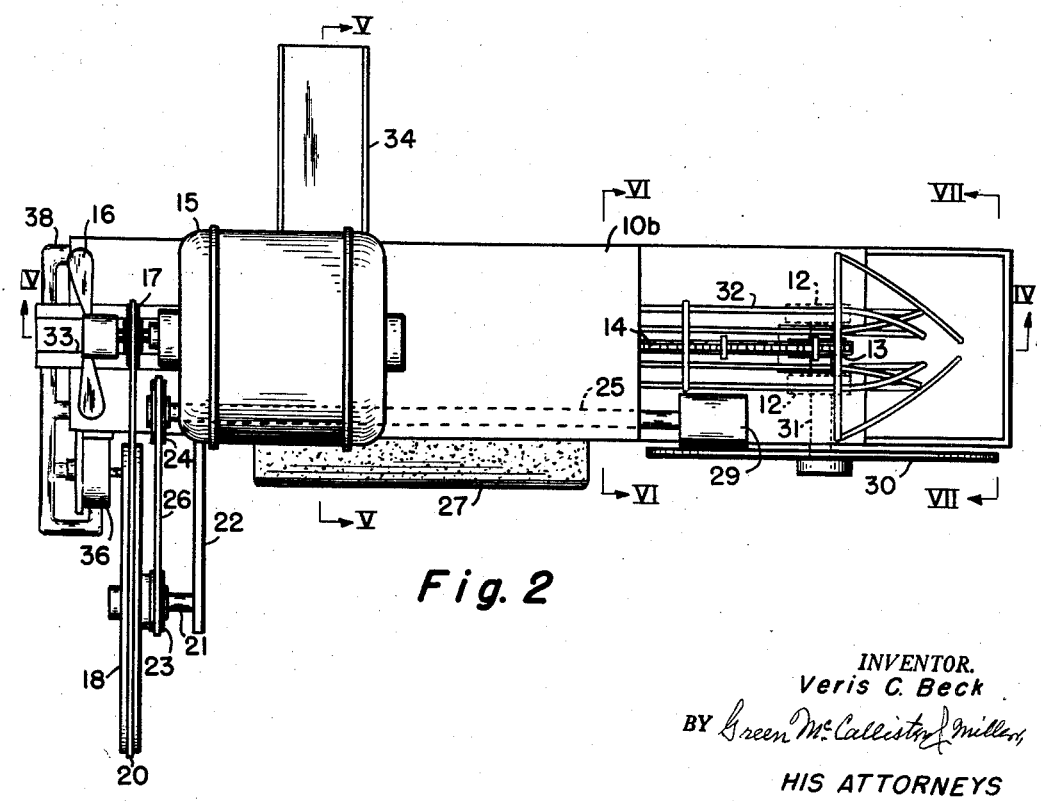
Figure 2 is a top plan view of the apparatus shown in Figure 1.
Figure 5:
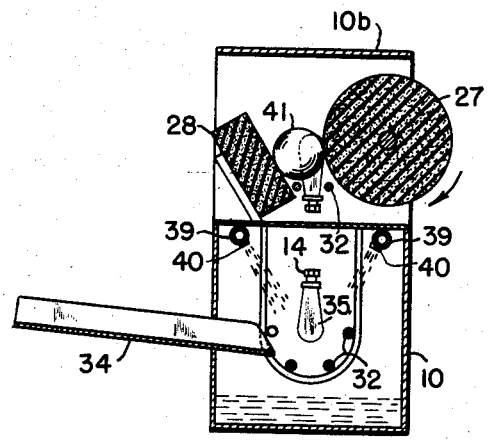
Figure 6:
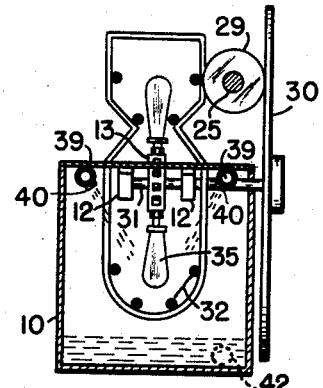
Figure 7:
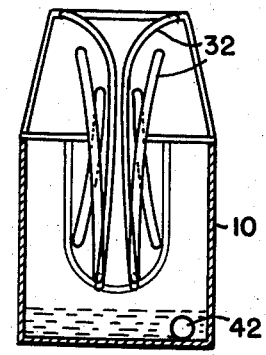

Figure 5 is a sectional view along the line V—V of Figure 2; a portion of the apparatus being omitted for convenience of illustration. Figure 6 is a sectional view along the line VI—VI of Figure 2; and Figure 7 is a sectional view along the line VII—VII of Figure 2, and in the case of each such section the view is taken as if looking in the direction indicated by the arrows associated with the corresponding section line.

Figure 8:
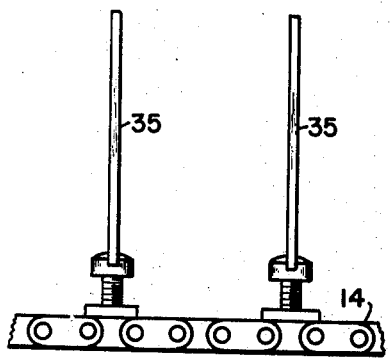
Figure 9:
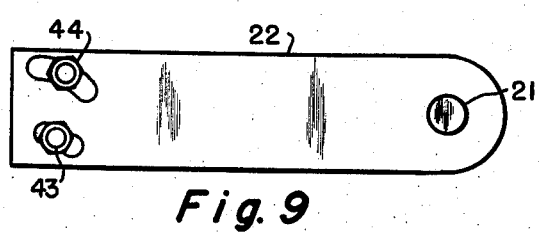

Figure 8 is a view illustrating a portion of a conveyor forming a part of the apparatus illustrated, and Figure 9 is an enlarged fragmental view of a bracket forming a detail of the apparatus illustrated.

From the standpoint of procedure the invention includes the procedural steps of separately subjecting each individual egg of a number of eggs, to the action of a cleansing liquid while the eggs are moving, preferably, in file-like formation, and in then separately subjecting each egg to a scrubbing or mild scouring action while it is being rotated and while it is also moving toward a delivery device or chute which conveys the cleaned eggs to a drying table or to some accessible location where they may be inspected, sorted and/or placed in containers for shipment.

These procedural steps are accomplished by means of apparatus such as shown in the drawings which includes a conveyor mechanism for moving eggs in file-like formation through a cleansing compartment where each egg is, in effect, separately subjected to the action of a series of liquid sprays. Each egg is then moved out of such compartment and subjected to the action of wiping, scouring or scrubbing devices, one of which is rotating and imparts a rotating or tumbling movement to the egg in contact with it. In the apparatus illustrated, each egg is conveyor-moved between, in contact with and along two wiping or scrubbing devices, one of which is rotating. Each egg is then conveyor-moved to a delivery chute through which the eggs are delivered to a drying table preparatory to being inspected, sorted and/or placed in containers for shipment.

One of the features of the invention is that a single motor, preferably an electric motor, is employed for actuating a conveyor, a pump, a wiping or scouring element and a fan, all of which are shown as a part of the illustrated embodiment of my invention. As illustrated, the conveyor moves eggs to be cleaned through the cleansing compartment and then to and along the wiping, scouring or scrubbing devices. The pump delivers cleaning liquid to a series of nozzles which deliver the liquid in the form of cone-shaped sprays or showers of separate drops onto the eggs as they are moved by the conveyor. The motor also actuates an element which is a part of the device, hereinafter termed wiping device, to which each egg is delivered as it moves toward the delivery chute. The chute delivers eggs to a drying table which may be employed in connection with the illustrated apparatus. The fan is employed to deliver a current of air onto eggs located on the drying table, which is not illustrated but is located so that it receives eggs issuing from the delivery chute.

Referring to the drawings and particularly to Figures 1, 2, 3 and 4, the apparatus illustrated includes a casing 10 which encloses a cleaning compartment and constitutes a container for a cleansing liquid 11 shown located in the lower portion of the casing 10. As illustrated, the casing 10 and its cover 10a constitutes a support for the various mechanisms forming a part of the egg cleaning apparatus. The cover 10a supports the spaced bearings 12—12 for the two shafts on which the sprockets 13 are mounted. The sprockets 13 are a part of a conveyor mechanism which includes a sprocket chain 14.

The cover 10a is shown as also supporting a casing part 10b which encloses the separate elements forming a part of the wiping device and also supports a motor 15, shown as an electric motor. A fan 16 is mounted on the shaft 15a of the motor and a sheave 17 is also mounted on that shaft. The sheave 17 drives sheaves 18 and 19 by means of a belt 20. The sheave 18 is mounted on a shaft 21 which is carried by an adjustable arm or bracket 22, shown as secured to an upright wall of the casing 10b. The sheave 19 drives a pump to be later described.

Figure 4:
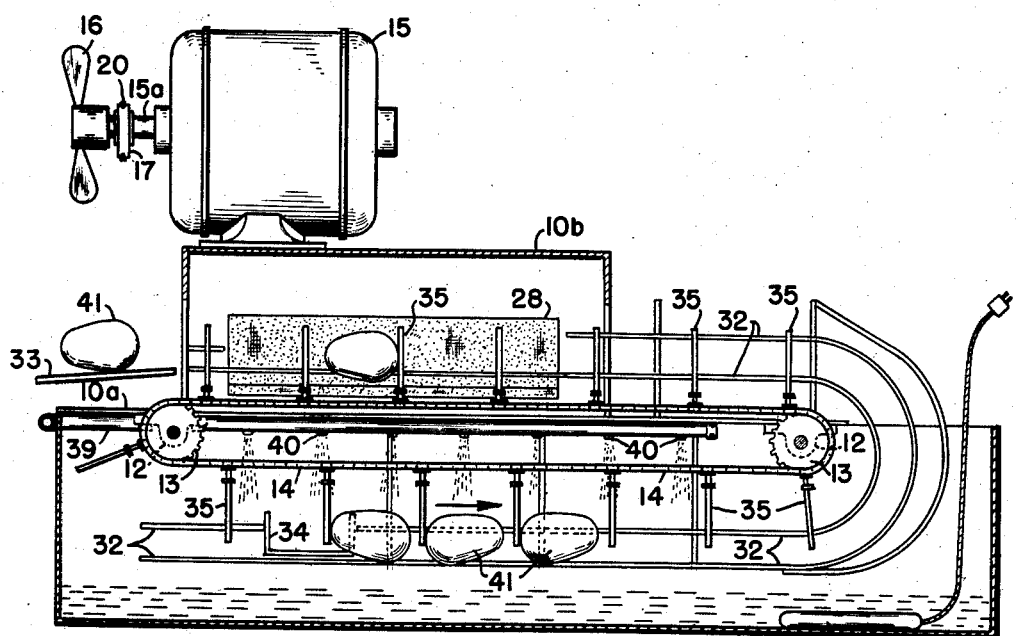
Figure 4 is a sectional view along the line IV—IV of Figure 2.

The shaft 21 carries a sheave 23 which is secured to sheave 18 and drives a sheave 24 mounted on a shaft 25. The shaft 25 is journaled in suitable bearings carried by the casing extension 10b. The sheave 24 is driven by sheave 23 by means of a belt 26. The shaft 25 carries an elongated wiping element 27 which is preferably formed of sponge rubber or similar material and, as will be described, cooperates with a stationary element 28 in subjecting eggs propelled by the conveyor mechanism to a mild scouring operation. The element 28 is also preferably formed of sponge rubber or similar material. A friction wheel 29 is mounted on shaft 25 and engages a friction disk 30. The disk 30 is mounted on a shaft 31 which is journaled in spaced bearings 12 carried by the cover portion 10a. One of the sprockets 13 is mounted on shaft 31 and is located between the bearings 12—12. As shown in Figure 4, the conveyor chain 14 carried by the spaced sprockets 13—13 is so located that one stretch, viz., the lower stretch of the chain, is located below the cover 10a, whereas, the other stretch of the chain is located above the cover. The chain 14 forms a part of a conveyor mechanism which moves eggs through the apparatus during the cleaning operation.

The conveyor mechanism also includes a wire guideway 32 for the eggs propelled by the conveyor chain. The guideway extends substantially parallel to the chain 14 and is located below the chain 14 in the casing 10. It is curved, as shown at the righthand end of Figure 4 and also in Figures 2 and 7, and extends above the cover portion 10a and above the chain 14. The guideway 32 is made up of wires, and those which guide the movement of eggs extend substantially parallel to the conveyor chain 14. A portion of the wire framework of the guideway 32 is interrupted by the elements 27 and 28 of the wiping device.

A chute 33 receives the eggs after they have been subjected to a scouring or wiping action of the elements 27 and 28 and as they move off of the guideway 32. This chute is inclined and delivers eggs from the washing apparatus onto a table (not shown) when they are subjected to a current of air generated by the fan 16.

Eggs are delivered to the washing apparatus through a chute 34 which extends through an aperture formed in the side wall of the casing 10 and is so positioned that it delivers eggs to the portion of the guideway 32 located within the casing 10. The chute 34 is inclined slightly so that eggs placed on it tend to roll downwardly toward the guideway 32 in such a way that when they are positioned on the guideway their major axis lies substantially parallel to it. It should be noted, however, that the position of the eggs on the guideway below the cover 10b is not important.

In order to propel eggs along the guideway, the conveyor chain is provided with a series of fan-shaped paddles or fingers 35 which are equally spaced along the chain 14 and are so arranged on the chain that they extend downwardly below the chain when moved to the lower stretch of the chain, and upwardly above the chain when moved to the upper stretch of the chain. The fingers 35 are about 3" apart along the chain 14, i. e., they are spaced so that an egg of normal length may be located between them. Each finger is also of such length that it is capable of propelling an egg along the guideway 32 throughout the entire length of the guideway.

The pulley 19 is mounted on the shaft of a pump 36. The intake port of the pump communicates with the lower portion of the casing 10 through a pipe 37. The delivery port of the pump 36 communicates with a pipe 38 which in turn communicates with two parallel pipes 39—39 which extend along a portion of the casing 10 above the guideway 32 and parallel to the guideway. As shown, the pipes 39 are secured to the cover 10a and each pipe is provided with a series of spaced spray nozzles 40 which are so arranged that they direct sprays of liquid onto eggs moving along the guideway throughout a substantial portion of the length of the casing 10.

In the drawings I have employed the numeral 41 to designate eggs located within the cleaning apparatus. A heater such as an electric heater 42 is employed for heating or at least maintaining the temperature of the cleaning liquid contained in the casing 10. The level of the cleaning liquid within the casing 10 is preferably maintained below the guideway 32 so that all portions of the surface of each egg moving along the guideway is subjected to the forced flow of liquid issuing from each of the series of nozzles 40.

The operation of the apparatus is as follows:

On starting the motor 15 all moving parts of the apparatus are energized. The pump 36 delivers cleaning liquid to the double row of nozzles, each of which delivers the liquid in the form of a mass of separate drops moving at a high velocity. That is to say, the pump 36 delivers liquid from the lower portion of the casing to each of the spray nozzles 40 and the nozzles, in effect, deluge eggs moving along the guideway 32. Simultaneously, with the starting of the motor 15 the conveyor chain 14 starts to move in the direction of the arrow shown below the chain in Figure 4. The movement of the chain causes the fingers 35, carried by it, to move past the delivery end of the chute 34 and in doing so permits eggs to move from the chute onto the guideway 32. The spacing of the fingers 35 is preferably such that a single egg is located adjacent fingers and, consequently, each egg received by the apparatus is moved individually along the guideway and is separately subjected to the shower of liquid issuing from the spray nozzles 40.

After each egg, moving along the guideway 32, has passed the last of the spray nozzles 40, it is lifted along the curved portion of the guideway by the finger 35 in contact with it. This lifting also occasions a turning of each egg and tends to position it on the portion of the horizontal portion of the guideway above the cover 10a so that the major axis of the egg lies substantially parallel to the portion of the guideway on which it is located. As each egg is propelled along the horizontal portion of the guideway above the cover 10a, it is moved between and into contact with the wiping elements 27 and 28.

Figure 3:
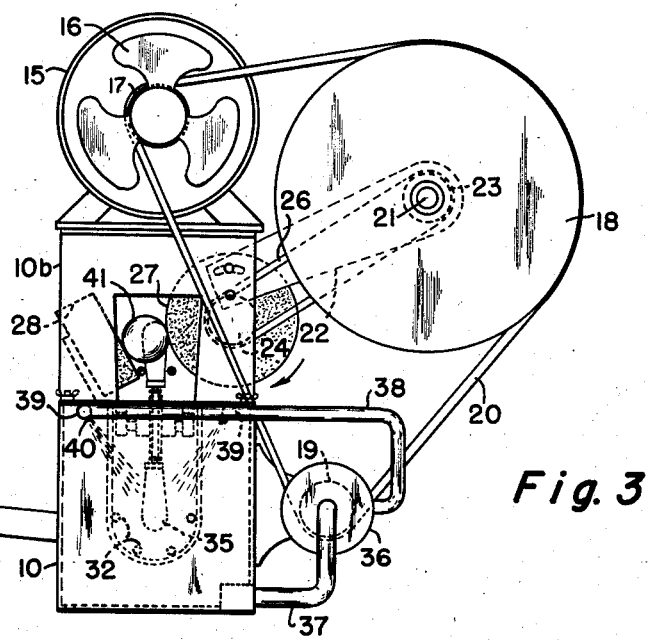
Figure 3 is an end elevation of the apparatus.

As previously noted, the element 27 is mounted on the shaft 25 and is rotated by the shaft in the direction of the arrow shown in Figure 3. As each egg contacts the rotating member 27 the rotation of that member tends to lift the egg free of the guideway 32 and to move it upwardly along the inclined, adjacent face of the wiping member 28. Thus, each egg engaged by the wiping members 27 and 28 is subjected to the propelling action of the conveyor fingers 35 in contact with it and it is also subjected to a rolling action by the rotation of the member 27. The tendency of each egg in contact with the members 27 and 28 to move upwardly along the inclined surface of the member 28 occasions a periodic lessening of the frictional grip of the member 27 on the egg, with the result that while each egg is rotated by the element 27 it is constantly changing its position with relation to both the members 27 and 28 as it is moved along those members by the action of the conveyor chain 14 and one of the fingers 35. The wiping or scouring action of the members 27 and 28 is, therefore, effective on the entire surface of each egg.

As each egg moves out of contact with the wiping members it drops back onto the guideway 32 and is moved by the contacting finger 35 onto the delivery chute 33. As previously noted, the fan 16 is so positioned that it delivers a current of air to the eggs as they leave the delivery chute 33.

The rotation of the shaft 25 drives the friction disk 30 which is splined to the shaft 31. The rotation of the disk 30, therefore, occasions rotation of the sprocket 13 mounted on the shaft 31 and, consequently, drives the conveyor chain 14. In the apparatus illustrated the sheave 18 is carried by the adjustable bracket 22. The bracket 22 is secured to a vertical wall of the casing 10b by means of a bolt 43 shown in Figure 9 which passes through an aperture formed in the wall of the casing 10b and an aperture in the bracket 22. A second bolt 44 passes through an aperture in the wall of the casing 10b and also through an arc-shaped slot formed in the bracket 22. With this arrangement the position of the bracket can be readily shifted so as to maintain the proper tension in the belts 20 and 26 and the two bolts 43 and 44 clamp the bracket in the desired adjusted position.

The form and structure of each finger 35 is somewhat important. It is desirable to so form each finger 35 that it is always in contact with the egg moving along the guideway and positioned and immediately ahead of it and independently of the position of the egg. That is to say, each finger is of such shape and dimensions that independently of the position assumed by the egg engaged by it, the finger will always be capable of propelling the egg along the guideway. It is also desirable to so form the fingers 35 that the portion thereof which engages the eggs will be capable of yieldingly applying propelling force to the egg, and independently of the position of the egg relatively to the guideway. It is for this reason the fingers are paddle shaped.

I have referred to the elements 27 and 28 as forming a part of a scrubbing or scouring device. The reason for this is that these elements function to remove from the eggs particles of dirt and foreign material loosened by the prior delivery of cleansing liquid to the eggs in the form of masses of separate drops moving at a high velocity. It will also be apparent that the eggs moving in contact with the elements 27 and 28 may also be subjected to a shower of cleaning liquid. With such an arrangement foreign matter removed from the eggs is washed back into the casing 10 and the elements 27 and 28 are cleared of dirt and foreign material removed from the eggs by them.

While I have illustrated but one embodiment of my invention, it will be apparent that various changes, additions, modifications and omissions may be made in the apparatus illustrated without departing from the spirit and scope of my invention as defined by the appended claims.

What I claim is:

1. An egg washing apparatus including a washing compartment; a wiping mechanism located above said compartment; a conveyor mechanism for moving eggs through said compartment and into engagement with and beyond said wiping mechanism, said conveyor mechanism including a U-shaped guideway with one leg thereof located within and extending through said compartment and the other leg located above said compartment and extending in the direction of the lower leg, a chain conveyor cooperating with both legs of said guideway in moving eggs along said guideway, through said compartment and into operative engagement with said wiping mechanism; said wiping mechanism consisting of an elongated flexible stationary member extending along the upper leg of said chain conveyor on one side thereof and in engaging relationship with eggs moving with such leg of said conveyor, and an elongated rotatable member opposite to said stationary member and extending along the upper leg of said conveyor chain substantially parallel to such leg and said stationary member and opposite to said stationary member, and a motor for actuating said chain and for rotating said rotatable member.

2. An egg washing apparatus including a washing compartment; a wiping mechanism located above said compartment; a conveyor mechanism for moving eggs through said compartment and into engagement with and beyond said wiping mechanism, said conveyor mechanism including a U-shaped guideway having one leg thereof located within and extending through said compartment and the other leg located above said compartment and extending in the direction of the lower leg, and a chain conveyor cooperating with both legs of said guideway in moving eggs therealong and into operative engagement with and past said wiping mechanism; said wiping mechanism consisting of an elongated flexible member extending along and substantially parallel to the upper leg of said chain conveyor on one side thereof and in egg-engaging relationship with eggs moving with such leg of said chain conveyor, and an elongated flexible rotatable member extending along the other side of the upper leg of said chain and located opposite to and in cooperative relationship with said stationary member; means for delivering a flow of washing liquid to eggs moving through said compartment; a pump for maintaining such flow and a single motor for operating said pump for actuating said chain conveyor and for rotating said rotatable wiper member.

3. An egg washing apparatus having a washing compartment, a wiping compartment, a conveyor mechanism for moving eggs in an aligned series through said compartments; said conveyor mechanism including a stationary guideway extending through said compartments and a conveyor chain extending along said guideway and cooperating therewith in moving eggs therealong; a wiping mechanism located in said wiping compartment including an elongated flexible stationary member extending along one side of said guideway in engaging relationship with eggs moving therealong and with the egg-engaging face thereof upwardly inclined away from said guideway and an elongated rotatable member located opposite to and substantially parallel with said stationary member and extending along and partially overhanging said guideway on the side thereof opposite said stationary member, and a motor for rotating said rotatable member and for actuating said chain.

4. In combination in an egg washing apparatus, a washing compartment and a wiping compartment; a conveyor mechanism for moving eggs in file-like formation successively through said washing compartment and said drying compartment, said conveyor mechanism including a stationary guideway extending through said compartments and a conveyor chain extending along and throughout the length of said guideway and cooperating therewith in moving eggs through both said compartments; a wiping mechanism located in said wiping compartment and comprising a stationary, elongated, flexible member extending along one side of said guideway and an elongated, rotatable member located opposite to said stationary member and extending substantially parallel therewith and located in engaging relationship with eggs moving along said guideway; said stationary member having one face thereof located in engaging relationship with eggs moving along said guideway; and a motor for actuating said chain conveyor and rotating said rotatable member.

References Cited in the file of this patent

UNITED STATES PATENTS

| | | |
|---|---|---|
| 1,671,924 | Brogden | May 29, 1928 |
| 1,848,309 | Brogden | Mar. 8, 1932 |
| 2,438,666 | Hodson | Mar. 30, 1948 |
| 2,566,475 | Wright | Sept. 4, 1951 |
| 2,597,148 | Joseph | May 20, 1952 |